Figure 10:
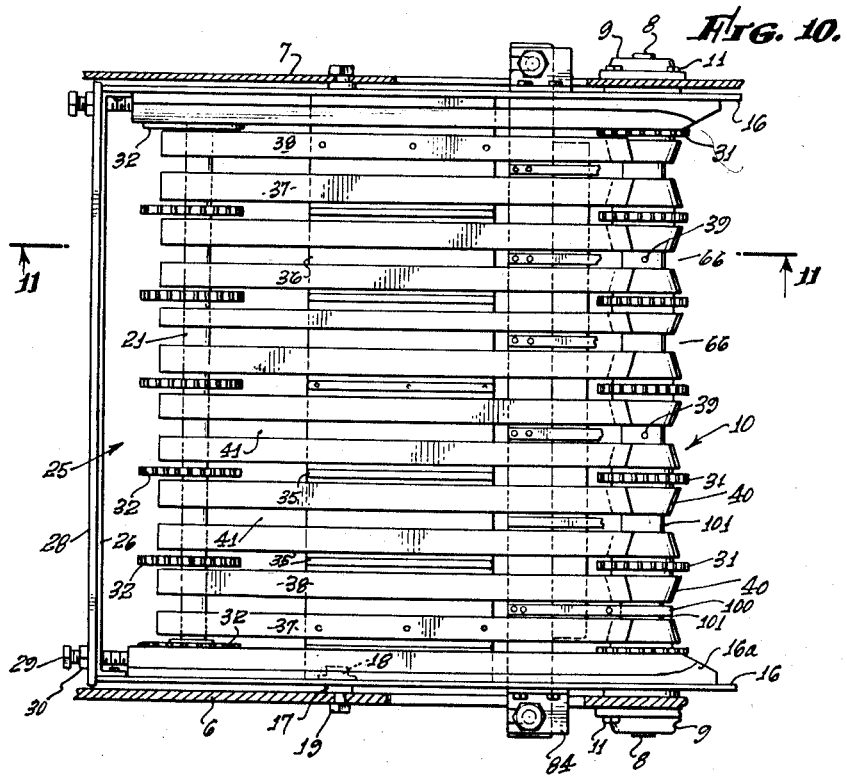

March 15, 1960 F. AHLBURG 2,928,599
ARTICLE COUNTING MACHINE
Filed March 12, 1956 3 Sheets-Sheet 1
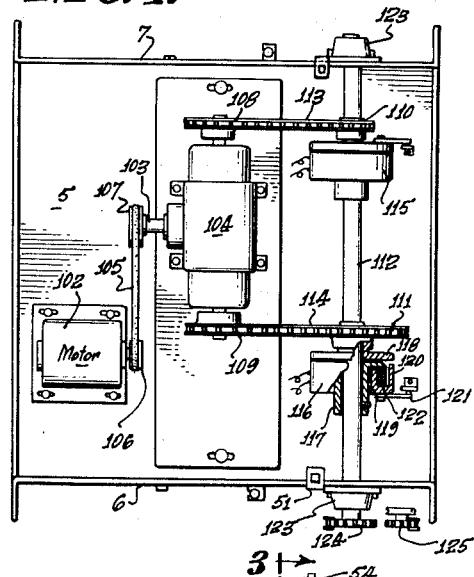
FIG. 1.
FIG. 4.
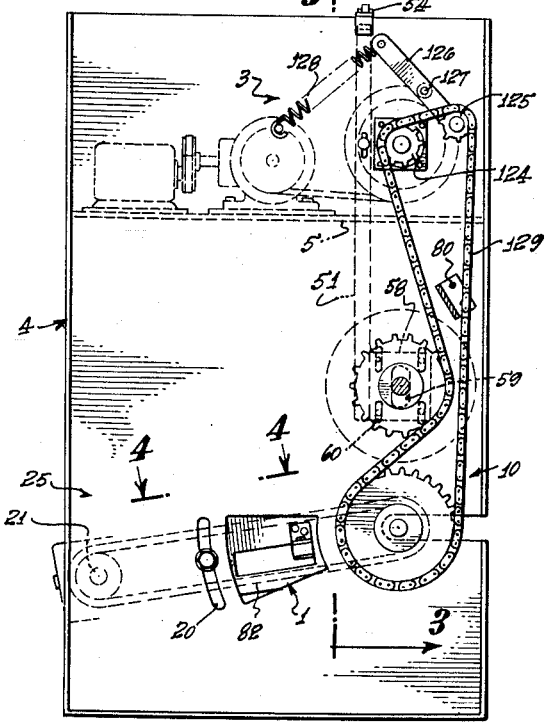
FIG. 2.
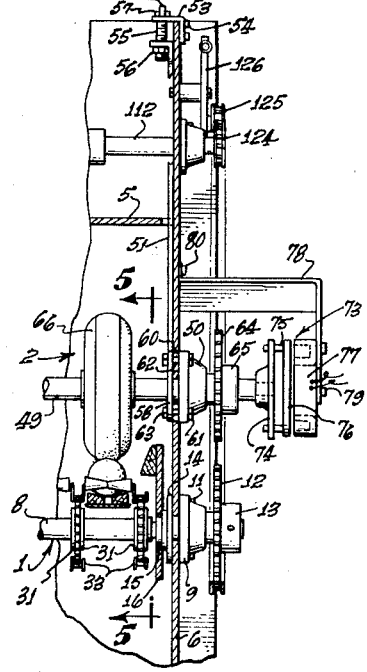
FIG. 3.
FRANK AHLBURG,
INVENTOR.
BY
Arthur W. Fuyak
ATTORNEY.

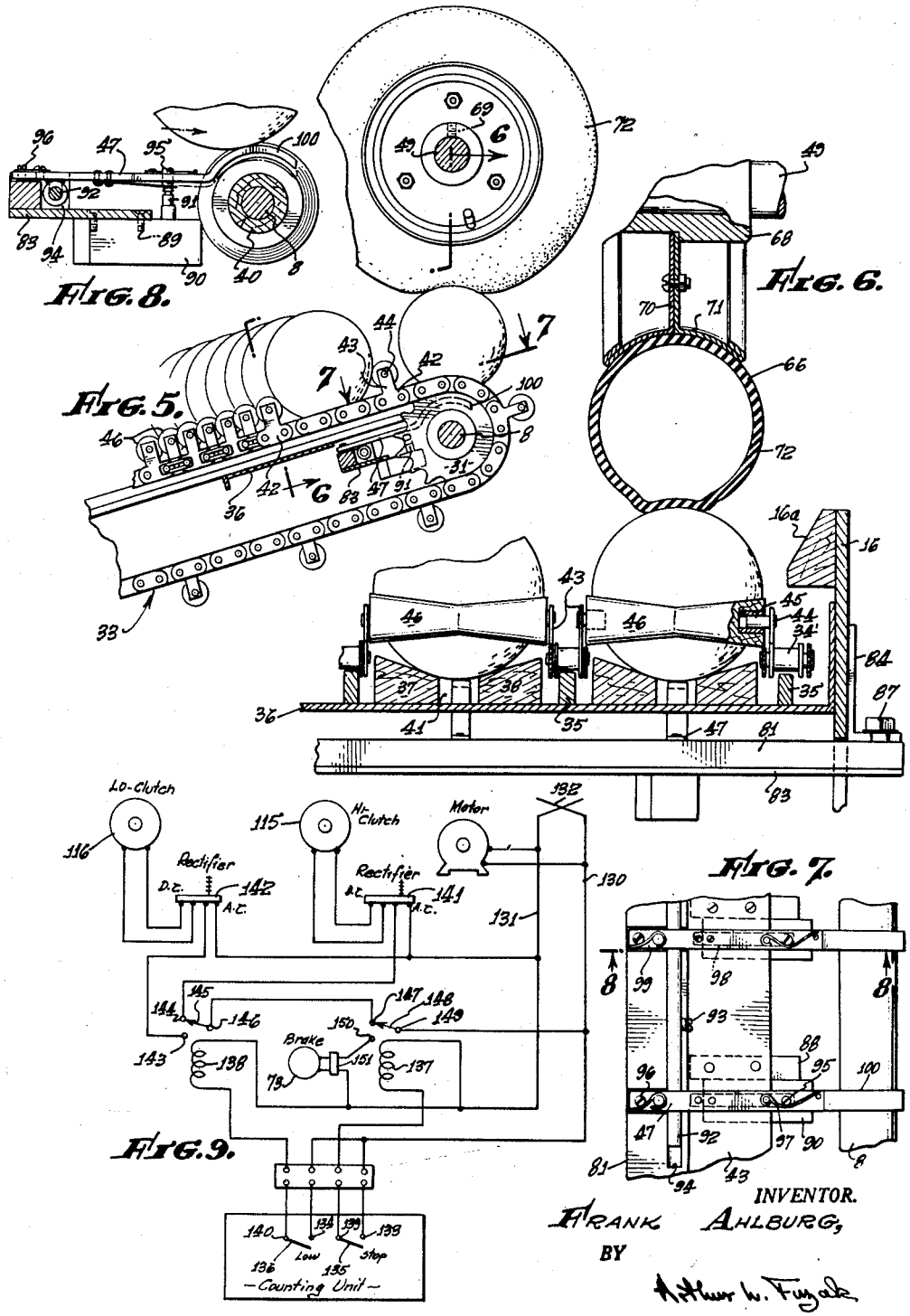

FRANK AHLBURG,
INVENTOR.

BY
Arthur W. Fuzek
ATTORNEY.

United States Patent Office 2,928,599
Patented Mar. 15, 1960

2,928,599
ARTICLE COUNTING MACHINE
Frank Ahlburg, Los Angeles, Calif.
Application March 12, 1956, Serial No. 571,015
7 Claims. (Cl. 235—98)

This invention relates to article counting machines and is more particularly concerned with a machine which will accurately cyclically count and deliver predetermined numbers of articles to successively positioned waiting containers.

It is a condition precedent to efficient operation in those industries and processing operations which market and sell products in specified quantities rather than by weight that machines be utilized in product flow lines which are capable of continuously delivering the counted articles to intermittently advanced cartons or other containers. Where such machines are not used, as is presently the case in many fruit and vegetable packing plants for example, labor cost is an appreciable factor in the final price of the product. Even where machines now known to the art are in commercial use, economy of operation is lacking because of their inability to guarantee delivery to the container of only the preset number of articles. While such machines may appear to be capable of working accurately, as a practical matter the inertia of the object to be delivered and other uncontrolled factors results in an unpredictable overage of from one to four or more objects in the packed carton. This of course, in addition to an inability to handle large volumes rapidly, is a prime factor in the reluctance of many producers and packers to substitute machine operation for manual labor.

Since this problem is most acute in the packing of citrus fruit, my machine will be described with reference to the counting and delivery of oranges although it will be apparent to those skilled in the art that it can be utilized in the packing of other fruits, such as apples, as well as other articles, both manufactured and of natural origins.

It is therefor an object of my invention to provide an article counting machine which is capable, under practical operating conditions, of accurate cyclical delivery of a predetermined number of articles to containers positioned at the delivery end of my machine.

It is a further object of my invention to provide a counting machine which is not only accurate and positive in article counting and delivery, but which can be operated at high speeds.

Another object of my invention is to provide a counting machine in which a series of snap action switch actuators are spaced from a series of flexible resilient control wheels a distance less than the cross-sectional dimension of the articles to be counted. This results in positive control over the objects to be counted and delivered during the counting impulse and further results in release of the object only after it has been counted.

I further aim to provide a counting machine in which control wheels receive articles to be counted from a conveyor and assume control and delivery of the articles across an actuator arm and to a container.

Another object is to provide an article counting machine having both a high initial and a low final delivery speed transmitted to a conveyor and to a series of control wheels.

I also desire to furnish an article counting machine in which the peripheral velocity of a series of control wheels is greater than the velocity of an article conveyor. This is a most important feature of my invention since I have discovered that delivery of an article over the end of a conveyor can not be positively controlled at commercially necessary speeds even in response to a braked stoppage of the conveyor, except through external control of the article.

Another object of my invention is to provide a novel switch actuator element assembly for use in an article counting machine, which can be easily adjusted to transmit an actuation impulse to the switch at varying linear contact positions with the actuator arm of the element of an article passing over it.

It is still another object of my invention to provide an article counting machine having a simple electric circuit which responds to counted impulses to cause actuation of a conveyor and a series of pneumatic control wheels at high and low speeds.

Figure 11:
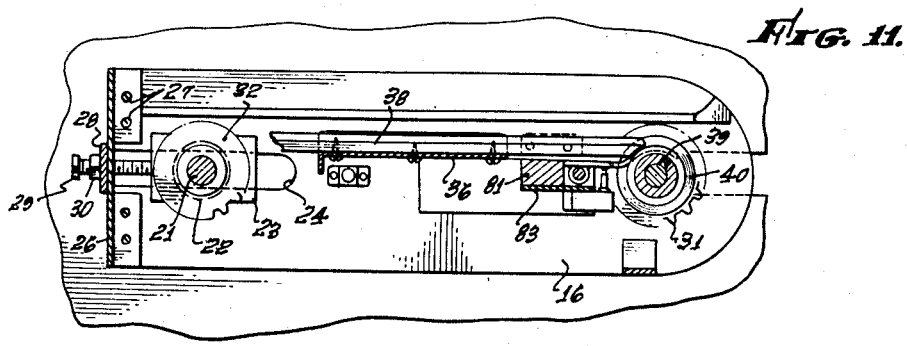
Figure 12:
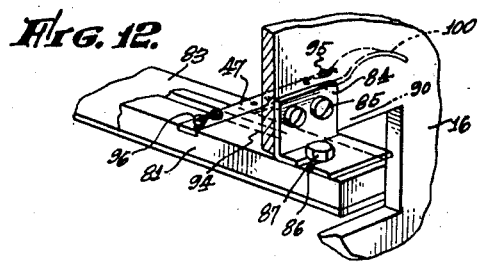

These as well as further objects of my invention will become apparent from the following description as related to the drawings, in which:

Figure 1 is a plan view of my machine;
Figure 2 is a side elevation;
Figure 3 is a view taken substantially on line 3—3 of Figure 2;
Figure 4 is a schematic view of a portion of the conveyor of my machine taken on line 4—4 of Figure 2;
Figure 5 is a cross-section taken on line 5—5 of Figure 3;
Figure 6 is a transverse-section taken substantially along line 6—6 of Figure 5;
Figure 7 is a partial plan view of the actuator assembly taken on line 7—7 of Figure 5;
Figure 8 is a detail cross-section taken on line 8—8 of Figure 7, showing an actuator element assembly of my machine;
Figure 9 is a block diagram of the clutch and brake control system of my machine;
Figure 10 is a plan view of my conveyor with parts omitted for clarity;
Figure 11 is a cross-sectional view taken on line 11—11 of Figure 10 and,
Figure 12 is a detail perspective view illustrating the retaining means for the snap action switch and the actuator arm of my machine.

Referring more specifically to the drawings, my machine broadly includes a conveyor 1, a separate article control unit 2 and a two speed drive assembly 3, all mounted on a frame 4. The drive assembly rests on support plate 5, while the conveyor and the article actuator unit are secured to side frames 6 and 7.

The conveyor has a drive shaft 8 which is journaled within bushings 9 secured to the side frames 6 and 7 at the delivery end 10 of my machine as by screws 11. This shaft extends exteriorly of one of the bushings and has a sprocket 12 fixed thereto by a retaining collar 13. A pair of collars 14 (Fig. 3) through which shaft 8 extends and which are provided with journals 15, are secured by the screws 11 to side frames 6 and 7 internally thereof in alignment with bushings 9. Pivoted upon journals 15 are a pair of conveyor side walls 16 which have article abutting shoulders 16a, retained in fixed angular position parallel to and spaced from side frames 6 and 7 by the spacers 17 and the nuts 18 and bolts 19. Arcuate slots 20 are provided in the side frames 6 and 7 in order to permit angular adjustment of the conveyor about shaft 8. As best seen in Figures 10 and 11 an idler shaft 21, parallel to the drive shaft, is journaled in bushings 22 of sliding bearing blocks 23 which are mounted for linear adjustment within slots 24, provided in conveyor side walls 16 at the receiving end 25 of the conveyor. An end bracket 26 is secured to each of the side walls by screws 27 and has a reinforcing member 28 fixed thereto. A pair of bolts 29 are threaded through lock nuts 30, through holes provided in bracket 26 and member 28, and are fixed to blocks 23 so as to be rotatable relative thereto. Turning these bolts adjusts the spacing of opposite ends of the idler shaft 21 from drive shaft 8. Two series of sprockets 31 and 32 are respectively secured to the drive shaft 8 and to the idler shaft 21 in longitudinal alignment respectively with each other and individual chains 33 are trained over longitudinally aligned pairs of these sprockets. Rollers 34 of chains 33 ride upon bearing rails 35 secured to a cross bracket 36, which is fixed to the conveyor side walls 16. Attached to the cross bracket 36 are a plurality of parallel article supporting rails 37 and 38 which extend longitudinally of the conveyor between chains 33 from a position of adjacency with the idler shaft 21 to one of adjacency with the drive shaft 8. These rails are each tapered inwardly from their outermost edges and are spaced apart a distance greater than the width of actuator arms, described hereinafter. Retained upon the drive shaft, as by set screws 39, are a series of article supporting spools 40 which are tapered and grooved peripherally to coincide with the taper of the article supporting rails 37 and 38 and with slots 41 formed between them. These spools simply serve as an extension of the article supporting rails over the drive shaft of my conveyor.

The individual chains 33 are spaced apart a distance greater than the diameter of the largest size of orange, for example, which it is desired to count and deliver to a container. Suitably spaced pairs of aligned chain side plates, as plates 42, are constructed to have transverse flanges 43 to which lateral pins 44, journaled to receive bushings 45 inset in rollers 46, are secured. The distance between adjacent rollers 46 will of course similarly be greater than the diameter of the largest size fruit to be delivered by the conveyor. These rollers are constructed of any suitable material, such as wood, and are preferably tapered inwardly from each end to provide a greater contact surface between the roller and the orange conveyed.

The tapered configuration of the article supporting rails and spools as well as the provision of slots 41, result in the transverse alignment of each article as it is conveyed to a position of contact with one of the series of actuator arms 47. Where it is desired to pack all oranges and lemons going through a packing house for example, this structure is important since it assures the proper alignment and therefore the counting of the smallest size fruit being processed.

It will be noted from a consideration of Figure 4 that the rollers 46 in transversely adjacent runs 67 of the conveyor are progressively offset, to provide offset article retaining pockets 48. As illustrated, these rollers are offset a distance equal to the dimension between the center points of adjacent link side plates 42 of the chains 33. The offset dimension is not however critical and the article retaining pockets in adjacent runs could in fact be substantially in alignment in view of the high degree of impulse distinguishability of electronic counting circuits now available. Even where article retaining pockets in adjacent runs of a conveyor are aligned, there is such slight statistical probability of two or more articles actuating the counting actuator arm 47 within the same $\frac{1}{10,000}$ or $\frac{1}{1,000}$ of a second that for practical, efficient operation, aligned pockets as utilized in combination with the other features of my machine will not permit delivery of more or less than the predetermined number of articles. However, I prefer to utilize the offset run conveyor illustrated to insure the utmost accuracy in counting and delivery of articles to waiting containers.

The conveyor unit 1 is, as previously described, mounted between side frames 6 and 7 for angular displacement from the horizontal about shaft 8 as a pivot. While I have illustrated the conveyor as angled downwardly from the horizontal approximately 20°, my machine will operate satisfactorily regardless of its slope, provided that the angle from the horizontal is not greater than the angle of repose of the articles upon this conveyor.

The article control unit 2 of my machine includes a drive shaft 49 which is parallel to conveyor drive shaft 8 and which is rotatably mounted in bushings 50, adjustably secured to side frames 6 and 7. As best shown in Figures 2 and 3, a height adjusting arm 51, flanged at its upper end, in sliding contact with the internal surface of each of side frames 6 and 7 is vertically adjustable by stud bolt 52 which extends downwardly through an angle 53 fixed to the side frame by screws 54 and which has a shank 55 threaded through a nut 56 secured to the flange. The stud bolt is retained in position by a collar 57 secured to its neck. Arm 51 has a plate 58, having an opening through which shaft 49 may pass, and is secured at its lower end in lateral alignment with bushing 50. Each side frame is provided with a vertically elongated slot 59 through which shaft 49 extends and with vertically elongated slots 60 for bolts 61. Slots 60 are of sufficient size to receive spacers 62 in order to prevent deforming the plate 58 when the bolts 61 are tightened down on nuts 63 secured to plate 58. It will be evident that the control wheel shaft may be adjusted vertically relative to the conveyor by simply turning stud bolt 52 and tightening the bolts 61.

As is the case with conveyor shaft 8, the control unit drive shaft 49 extends exteriorly of side frame 6 and is provided with a sprocket 64 which is secured to the shaft by retaining collar 65. Mounted upon this drive shaft are control wheels 66, corresponding in number with the number of conveyor runs 67 of my machine, and in transverse alignment with these runs. Each of these wheels has a central hub 68 which is retained upon the shaft 49 by a set screw 69. Secured to this hub is a two piece annular disc 70 having a concave rim 71 upon which a valved rubber tire 72 is positioned.

The control wheel shaft 49 is provided, exteriorly of retaining collar 65, with a brake assembly 73, which assures immediate stopping of the control wheels when the pre-set number of articles have been delivered to a container. Fixed to the end of shaft 49 is a drive disc 74 provided annularly with a series of holes which receive pins 75, freely reciprocable therein. These pins are secured at one end to a magnetic pole piece 76 in the form of a disc which is spaced from an axially movable with respect to the drive disc. Exteriorly of the pole piece is an electro magnet 77 which is attached to a bracket 78 by screws 79. Elongated holes, not shown, are provided in the bracket to permit vertical adjustment of the brake to correspond with the vertical position of the control wheel shaft. The bracket is fixed to the side frame 6 by screws 80. When the magnet is energized, pole piece will be attracted to and retained by the magnet thus preventing rotation of the control wheel shaft.

The control wheels 66 are spaced from the effective theoretical surface of retention of the articles to be counted a distance less than the diameter, or transverse dimension, of the smallest of a given lot of said articles to be delivered. For example, in the processing of oranges which may generally vary in diameter from 1½ inches to 3½ inches, the control wheels will be spaced from the surface of retention a distance less than 1½ inches. This spacing is just sufficient to result in the contacting and frictional gripping of the articles by the control wheels. It will be apparent to skilled workers in the field that it is not essential that the control wheels have pneumatic tires for gripping the articles, but other configurations using soft mechanical rubber or other resilient flexible material are suitable, provided they have the capacity for gripping the articles without damaging them. It will nevertheless be seen that the utilization of my pneumatic tires represents, because of their inflatibility to varying degrees of firmness and hence to varying degrees of frictional gripping, a substantial and important improvement over other configurations and I prefer to provide my machine with such tires.

The mechanical counting assembly includes a cross-sectionally rectangular, actuator arm mounting bar 81 which extends transversely of the delivery end of my machine between the conveyor side walls 16 and protrudes through openings 82 provided in side frames 6 and 7. A switch mounting plate 83, which extends forwardly from the front edge of the mounting bar toward the conveyor drive shaft and interiorly of the said walls, is secured to this bar exteriorly of each of side frames 6 and 7 in such manner as to permit easy removal of both the mounting bar and the plate. An angle 84 is fixed to each of the side walls 16 by screws 85 and is provided with a slot 86 through which a screw 87 is inserted and threaded through bar 81 and plate 83. Secured to plate 83 by bracket 88 and screws 89 are a plurality of snap action switches 90 (Figs. 7 and 8) having axially reciprocable spring loaded actuator pins 91. These pins extend upwardly into contacting engagement with the actuator arms 47 which are pivotally mounted on a pivot rod 92. This rod is secured by set screws 93, within a slot 94 extending longitudinally within mounting bar 81. The actuator arms are spaced transversely along the mounting block at positions on the centerline of conveyor runs 67 and are thus in longitudinal alignment respectively with control wheels 66. Arms 47 are provided with adjustment screws 95 and 96 which are retained against accidental displacement in any suitable manner, as by screw locks 97 and 98 and 99. These arms terminate in arcuate contact triggers 100, which extend upwardly through grooves 101 in article supporting spools 40 above conveyor shaft 8.

The conveyor and the control wheels of my machine are driven by the two speed drive assembly 3. This assembly has a motor 102, engaged to rotate the drive shaft 103 of a reducer 104 as by a V-belt 105 and pulleys 106 and 107. The power take-off of the reducer has a pair of sprockets 108 and 109 in alignment with sprockets 110 and 111 which are rotatably mounted upon the main drive shaft 112. A pair of chains 113 and 114 are respectively trained over sprockets 108 and 110 and sprockets 109 and 111. Sprockets 110 and 111 have different numbers of teeth in order to provide both high and low rotational velocity to shaft 112. For example, sprocket 110 may have 12 teeth while sprocket 111 may be provided with 36 teeth. Conventional magnetic clutches 115 and 116 are adapted to cause rotation of the shaft upon receipt of current. Each clutch has an annular disc 117 secured to the sprocket; a drive disc 118 provided with a journal and secured to shaft 112; a bushing 119, rotatably mounted on the journal and secured to a coil housing 120 which is fixed to plate 5 by an arm 121, and a magnetic coil 122 within the housing. Shaft 112 is rotatably mounted in bushings 123, secured to side plates 6 and 7 and is provided at one end with a sprocket 124, fixed thereto.

An idler sprocket 125, mounted at one end of an arm 126 which is pivoted about pin 127 and tensioned by spring 128 secured to its other end is coplanar with sprockets 12, 64 and 124. Thus, upon actuation of either of the magnetic clutches, sprocket 12 rotates in a clockwise direction while sprocket 64 rotates in a counter-clockwise direction as viewed in Figure 2.

The high speed and low speed clutches of the drive assembly are respectively actuated through the electrical circuit illustrated in Figure 9 to drive the conveyor and control wheels by a suitable electronic impulse receiving and counting unit, which forms no part of my invention and is therefore not shown. Standard 110 volt supply lines 130 and 131, provided with a main power supply switch 132, are respectively circuited to terminals 133 and 134 of switches 135 and 136, and through solenoid coils 137 and 138, respectively, to the opposed terminals 139 and 140 of these switches. In addition, a pair of rectifiers 141 and 142 are respectively connected to power supply line 131 and to opposite terminals 143 and 144 of a solenoid actuated switch 145 adjacent to solenoid coil 138. The other terminal 146 of switch 145 is connected to a terminal 147 of a second solenoid actuated switch 148 adjacent to coil 137. Terminal 149 of the latter switch is connected to supply line 130. With the switch position illustrated, current flows through switches 148 and 145 to rectifier 141 which provides a D.C. voltage to the coil of the high speed clutch 115. When switch 135 is actuated upon termination of a counting cycle, as by a solenoid (not shown) within the counting unit, to closed position in contact with terminal 133, current flows through solenoid coil 137, throwing switch 148 into an open position in contact with terminal 150 thus disengaging both the high and the low speed clutches. In closed position current also is supplied to the coil of the brake magnet, through the rectifier 151 causing actuation of brake 73 and stopping rotation of the control wheels. Low speed operation of my machine results from closing switch 136 thus causing current to flow through coil 138 and moving switch 146 out of contact with terminal 144 and into contact with terminal 143. Current is thereby supplied to rectifier 142 which in turn supplies a D.C. voltage to the Lo-clutch 116.

In operation, starting the motor by closing main power supply switch 132 results in rotation of sprockets 108 and 109 of the reducer. If switch 135 has been left in contact with terminal 133, a re-cycle switch in the counting unit is activated manually to open position to energize Hi-clutch 115 and cause rotation of the conveyor sprocket 12 and movement of the top flight of conveyor rollers towards the control wheels. The latter rotate in a counter-clockwise direction as seen in Figure 2.

Oranges or other objects to be counted are delivered in any suitable manner as by a conveyor belt or chute to the receiving end 25 of my conveyor where they occupy positions within the individual pockets 48. These oranges are thus conveyed into positions of contact with the control wheels 40. The relative rotational speeds of shafts 8 and 49 are such that the peripheral velocity of wheels 66 will be greater than the velocity of the oranges contacting these wheels. Because of this velocity relationship and because the periphery of each of these wheels is spaced from the effective surface supporting of an orange a distance less than the diameter of the orange, a control wheel will, immediately upon contacting an orange, frictionally grip the orange and assume control of it, conveying it forwardly upon rails 37 and 38, away from contact with rearmost roller 46 of the pocket 48 containing that orange and into contact with and across the finger 100 of the actuator arm 47 therebeneath. Each actuator arm set screw 95 is adjusted in such manner that deflection of a counter trigger 100 depresses switch pin 91 of the switch 90 therebeneath and transmits an electrical impulse to the counting unit just prior to release of the orange by the control wheel. An orange is therefore not released for delivery into a waiting container until it has been counted and similarly it is not retained after it has been counted.

If for example, it is desired to count 100 articles, the counting unit is pre-set to close the circuit between terminals 134 and 140 by closing switch 136 when the counting unit has received and totaled a predetermined number of articles which is short of 100 by a small number. Thus for instance, when 95 or 96 articles have been totaled, the foregoing switch is automatically closed, causing de-energization of Hi-clutch 115 and energization of Lo-clutch 116, thereby instantly decreasing the rate at which articles are being delivered to the container. When the one hundredth article has deflected one of the actuator arms 47 to transmit an electrical impulse to the counting unit, switch 135 automatically closes, causing the conveyor and control wheels to stop and causing application of a braking force to the control wheel shaft before momentum can possibly operate to cause delivery of an excess article to the container. Motor 102 remains running, and all that is necessary to repeat the foregoing cycle is to manually activate a recycle switch which disengages switch 135 and resumes high speed operation. Containers can of course be mechanically positioned at, and removed from, the delivery end 10 of my conveyor and a time delay recycle switch can be provided to permit complete automatic operation of the counting and filling steps.

While I have specifically disclosed a machine capable of rapidly, efficiently and accurately counting and delivering a pre-determined number of articles to intermittently positioned waiting containers, many variations of my invention will occur to those skilled in the art. For example, commercial operation at lessened delivery speeds may permit the utilization of a single speed; or, the proper velocity relationship between the control wheels and the articles to be counted may be obtained by making the radius of the control wheels less than the effective radius of revolution, about the conveyor drive shaft, of the control wheel contact points with the articles to be counted and the relative rotational speed of the control wheels increased. Further modification of my invention will be evident to those skilled in the art and I therefore desire to be limited in the scope of patent protection afforded only by the following claims.

I claim:

1. In a device for rapidly delivering therefrom a precise whole number of articles, the combination of: means providing a counting station; means conveying articles in sequence to said counting station; delivering means receiving each of said articles in its order in said sequence at said counting station and immediately accelerating the speed of movement of said article and delivering the latter from said device, the period of contact between said delivering means and said article being very brief; means for sequentially counting each of said articles individually during the interval it is being contacted by said delivering means; means for driving said delivering means at a high speed or at a low speed; brake means for suddenly halting movement of said delivering means; means responsive to said counting means for causing said drive means to shift from high speed to low speed, when said device has delivered slightly fewer than said whole number of articles in a given cycle of operation; and means responsive to said counting means when the latter counts the arrival of the final article of said whole number of articles at said counting station, to cause said drive means to stop driving said conveying means and to cause said brake means to halt movement of said delivering means just after the latter has delivered from said device said final article, and before another article can be so delivered.

2. In a device for rapidly delivering therefrom only a precise number of citrus fruits or the like of any of a wide variety of diameters, which comprises: means for conveying sequences of individual fruits along parallel pathways each of which terminates in a counting station, the fruits in successive pathways being conveyed in progressively staggered relation, viewed transversely, whereby no two fruits arrive simultaneously at said counting stations; counter triggers one of which is disposed in the counting station in each of said pathways; wheels having flexible pneumatic tires and rotatable about a horizontal axis, each wheel being disposed in the vertical plane of one of said pathways, above the counting station thereof, said wheels being positioned to yieldably press the individual fruits passing therebeneath against said triggers to actuate the latter, and being sufficiently yieldable to accommodate fruits of any of said diameters; counting means responsive to actuation of said triggers to totalize the number of fruits delivered from said device in a given cycle of operation; means for driving said conveying means and said wheels correlatively whereby said wheels substantially accelerate the rates of travel of said fruits as they pass through said counting stations, said means being adapted to drive said conveying means and wheels at high speed or at a relatively low speed; brake means for suddenly halting movement of said drive means; means responsive to said counting means for causing said driving means to shift from high speed to low speed when said device has delivered therefrom in said cycle slightly fewer than said whole number of fruits aforesaid; and means responsive to said counting means when the latter counts the arrival of the final fruit of said whole number of fruits at one of said counting stations, to cause said driving means to stop driving said fruit conveying means and said wheels, and to cause said brake means to halt movement of said conveying means and wheels before another fruit can be delivered from said device.

3. In a device for rapidly delivering therefrom citrus fruits or the like of any of a wide variety of diameters which comprises: means for conveying sequences of individual fruits along parallel pathways each of which terminates in a counting station, the fruits in successive pathways being conveyed in progressively staggered relation whereby no two fruits arrive simultaneously at said counting stations; a counter trigger in each pathway at each station; a wheel having a flexible pneumatic tire and rotatable about a horizontal axis in the vertical plane of said pathway and above said station, said wheel being positioned to yieldably press each fruit passing therebeneath against said trigger to actuate the latter and being radially yieldable to accommodate fruits of any of said diameters; means for driving said conveying means and said wheels at correlative speeds whereby each wheel substantially accelerates the rate of travel of each fruit as it passes through said counting station, said wheel assisting in delivery of said fruit from said counting station as it parts contact with said wheel; and counting means responsive to each trigger for counting said fruits passing through said counting stations.

4. In a device for rapidly delivering therefrom only a precise number of fruits or the like of any of a wide variety of diameters, which comprises: means for conveying sequences of individual fruits along parallel pathways each of which terminates in a counting station, the fruits in successive pathways being conveyed in progressively staggered relation whereby no two fruits arrive simultaneously at said counting stations; counter triggers, one of which is disposed in the counting station in each of said pathways; wheels having flexible tires and rotatable about a horizontal axis, each wheel being disposed in the vertical plane of one of said pathways above the counting station thereof, said wheels being positioned to yieldably press the individual fruits passing therebeneath against said triggers to actuate the latter and being yieldable to accommodate fruits of any of said diameters; counting means responsive to actuation of said trigger to totalize the number of fruits delivered from said device in a given cycle of operation; means for driving said conveying means and said wheels correlatively whereby said wheels accelerate the rates of travel of said fruits relative to said conveying means as the fruits leave said counting stations; brake means for halting movement of said drive means; and means responsive to said counting means when the latter counts the arrival of the final fruit of said whole number of fruits at one of said counting stations to cause said driving means to stop driving said conveying means and said wheels and to cause said brake means to halt movement of said conveying means and wheels before another fruit can be delivered from said device.

5. In an article counting device for rapidly handling a plurality of discrete articles fed thereto in random manner and delivering a predetermined number of said articles to a container, the combination of: a conveyor means provided with means defining a plurality of parallel pathways for conveying said articles in progressively staggered relation to a plurality of transversely arranged counting stations whereby only one article arrives at said counting stations at one time; counting means at each counting station including a counter trigger and a wheel spaced thereabove, each wheel having a flexible circumferential surface to yieldably press an article passing between said wheel and said trigger against said trigger to actuate the same; means responsive to actuation of said triggers to count the total number of articles passing beneath said wheels in a given cycle of operation; means for driving said conveyor means and said wheels in correlation whereby each wheel positively advances an article relative to the conveyor means as it passes therebeneath; brake means for stopping said drive means; and means responsive to said counting means when a predetermined number of articles have passed beneath said wheels to cause said driving means to stop said conveying means and said wheels before another article can be delivered from said counting stations.

6. In a device as stated in claim 5 wherein said conveyor means is provided with a discharge end, and each counting station is at the discharge end of said conveyor means.

7. In a counting device for fruit or the like and for delivering a predetermined number of fruit or the like to a container, the combination of: a conveyor means provided with means defining a plurality of parallel pathways for advancing a plurality of fruit in progressively staggered relation to a plurality of transversely arranged counting stations, said conveyor means having a delivery end provided by an abrupt change in direction of said pathway means, said counting stations being proximate to said delivery end; counting means at each counting station including a counter trigger and a wheel spaced thereabove, each wheel having a yieldable circumferential surface to yieldably accommodate fruit of different shape and size and to press a fruit passing between said wheel and said trigger against said trigger to actuate the same; means responsive to actuation of said trigger to count the total number of fruit passing beneath said wheels; means for driving said conveyor means and said wheels in correlation whereby each wheel and conveyor means cooperate to advance a fruit through a counting station to the delivery end of said conveyor means; brake means for stopping said drive means; and means responsive to said counting means when a predetermined number of fruit have been counted to cause said driving means to suddenly stop said conveying means and said wheels before another fruit can be delivered from said delivery end.

References Cited in the file of this patent

UNITED STATES PATENTS

| | | |
|---|---|---|
| 2,320,275 | Grout | Aug. 7, 1941 |
| 2,493,464 | Nelson | Jan. 3, 1950 |
| 2,528,196 | Von Till | Oct. 30, 1950 |
| 2,581,693 | Mumma | Jan. 8, 1952 |
| 2,619,216 | Kinnicutt | Nov. 25, 1952 |
| 2,710,934 | Senn | June 14, 1955 |
| 2,736,495 | Calou | Feb. 28, 1956 |
| 2,761,361 | Hornberger | Sept. 4, 1956 |